(12) United States Patent
Frank et al.

(10) Patent No.: US 11,851,512 B2
(45) Date of Patent: Dec. 26, 2023

(54) FLAME-RETARDANT COPOLYMERS AND MOLDING COMPOUNDS

(71) Applicants: Hochschule Hamm-Lippstadt, Hamm (DE); Universität Siegen, Siegen (DE)

(72) Inventors: Petra Frank, Siegen (DE); Ulrich Jonas, Siegen (DE); Michael Luksin, Hamm (DE); Sabine Fuchs, Hamm (DE)

(73) Assignees: UNIVERSITAT SIEGEN, Siegen (DE); HOCHSCHULE HAMM-LIPPSTADT, Hamm (DE)

( * ) Notice: Subject to any disclaimer, the term of this patent is extended or adjusted under 35 U.S.C. 154(b) by 0 days.

(21) Appl. No.: 17/757,628

(22) PCT Filed: Dec. 17, 2020

(86) PCT No.: PCT/DE2020/101077
§ 371 (c)(1),
(2) Date: Jun. 17, 2022

(87) PCT Pub. No.: WO2021/121485
PCT Pub. Date: Jun. 24, 2021

(65) Prior Publication Data
US 2023/0036329 A1 Feb. 2, 2023

(30) Foreign Application Priority Data
Dec. 19, 2019 (DE) ..................... 10 2019 135 325.4

(51) Int. Cl.
| | |
|---|---|
| C08F 212/08 | (2006.01) |
| C08F 212/36 | (2006.01) |
| C08F 230/02 | (2006.01) |
| C08K 3/06 | (2006.01) |
| C08K 5/5317 | (2006.01) |
| C08K 5/5399 | (2006.01) |
| C09K 21/14 | (2006.01) |

(52) U.S. Cl.
CPC .......... *C08F 212/08* (2013.01); *C08F 212/36* (2013.01); *C08F 230/02* (2013.01); *C08K 3/06* (2013.01); *C08K 5/5317* (2013.01); *C08K 5/5399* (2013.01); *C09K 21/14* (2013.01)

(58) Field of Classification Search
CPC .... C08F 212/08; C08F 212/36; C08F 230/02; C08K 3/06; C08K 5/5399; C08K 5/5317; C09K 21/14
USPC ......................................................... 524/609
See application file for complete search history.

(56) References Cited

U.S. PATENT DOCUMENTS

| | | |
|---|---|---|
| 2009/0306275 A1 | 12/2009 | Inagaki |
| 2011/0245360 A1 | 10/2011 | Hahn et al. |
| 2012/0172467 A1 | 7/2012 | Bellin et al. |
| 2019/0338076 A1* | 11/2019 | Pyun ................. H01M 4/628 |

FOREIGN PATENT DOCUMENTS

| | | |
|---|---|---|
| WO | 2011095540 A2 | 8/2011 |
| WO | 2011121001 A1 | 10/2011 |
| WO | 2012089667 A1 | 7/2012 |
| WO | 2013028344 A1 | 2/2013 |
| WO | 2017004186 A1 | 1/2017 |
| WO | 2018232155 A1 | 12/2018 |

OTHER PUBLICATIONS

Zhang et al., "Inverse Vulcanization of Elemental Sulfur and Styrene for Polymeric Cathodes in Li-S Batteries", Journal of Polymer Science, Part A: Polymer Chemistry, vol. 55, pp. 107-116. Sep. 15, 2016.
Dutkiewicz et al., "Synthesis and Flame Retardant Efficacy of Hexakis(3-triethoxysilyl)propyloxy) cyclotriphosphazene/silica Coatings for Cotton Fabrics", Polymer Degradation and Stability, vol. 148, pp. 10-18. Dec. 2, 2017.
Written Opinion and International Search Reportin in International Application PCT/DE2020/101077 with partial translation, 15 pages, dated Mar. 29, 2021.

* cited by examiner

*Primary Examiner* — Hui H Chin
(74) *Attorney, Agent, or Firm* — Heslin Rothenberg Farley & Mesiti, P.C.

(57) ABSTRACT

The invention relates to copolymers and molding compounds having reactively bonded sulfur and an overall low sulfur content. The copolymers and molding compounds of the invention are substantially colorless and odorless while sufficiently flame-retardant and can be used in the building industry and electrical industry.

20 Claims, No Drawings

FLAME-RETARDANT COPOLYMERS AND MOLDING COMPOUNDS

CROSS REFERENCE TO RELATED APPLICATIONS

This application is a U.S. National Phase filing under 35 U.S.C. § 371 of International Application PCT/DE2020/101077, filed on Dec. 17, 2020, and published as WO 2021/121485 A1 on Jun. 24, 2021. PCT/DE2020/101077 claims priority from German application number 10 2019 135 325.4, filed on Dec. 19, 2019. The entire contents of each of these prior applications are hereby incorporated herein by reference.

The present invention relates to copolymers and molding compounds having reactively bonded sulfur and an overall low sulfur content. In this copolymer, the sulfur is covalently bonded. The copolymers and molding compounds of the invention are substantially colorless and odorless while sufficiently flame-retardant to pass standardized flame tests such as DIN 4102-2 (B2) and can be used in the building industry and electrical industry.

The finishing of styrene homo- and copolymers with flame-retardancy is important for a large number of applications, for example for polystyrene particle foams made from expandable polystyrene (EPS) or extruded polystyrene foam sheets (XPS) for insulating buildings, as well as for injection molded parts made from HIPS, ABS, ASA, etc. for use as parts and components in the electrical and electronics sector.

Polymers, which are made up of styrene monomers, account for a percentage of the total production volume of approx. 10% by weight of the entire global plastics production and are thus the fourth largest group of plastics produced worldwide. Homopolystyrene (PS) is primarily used in food packaging. It is also used as particle foam or extruded foam in packaging and as thermal insulation. Polystyrene as such is extremely flammable in the event of a fire and does not self-extinguish. In addition, there is a lot of soot and smoke gas formation. The polymer can only be made flame-retardant by adding suitable flame-retardant additive systems. Due to its large surface area, intumescent and crust-forming flame-retardant systems are not sufficiently effective when it is used as foam. Therefore, gas-phase active flame retardants such as, for example, brominated flame-retardant additives having suitable synergists (e.g. the thermal free-radical generators dicumyl peroxide, di-tert-butyl peroxide or dicumyl) must be used. Halogen-containing, low-molecular substances are typically highly environmentally unfriendly.

Due to its persistent, bioaccumulative and toxic properties, the hexabromocyclododecane used in polystyrene foams in the past was only recently replaced by a polymeric and polybrominated flame retardant. Another alternative to the flame-retardant polystyrene polymers described thus far is blending polystyrene with other, less flammable polymers. For example, WO 2013/028344 A1 describes the fact that polystyrene was blended with a halogenated polyphenylene ether (PPE) in order to obtain the necessary flame retardancy.

In order to be able to adjust the mechanical properties of styrene polymers, styrene can be copolymerized with a wide variety of comonomers. The corresponding products are then the copolymers used: poly(acrylonitrile-butadiene-styrene) (ABS), poly(styrene-butadiene-styrene) (SBS), poly(styrene-acrylonitrile) (SAN), poly(acrylonitrile-styrene-acrylate) (ASA), poly(styrene butadiene) rubber (SBR) and high-impact polystyrene (HIPS).

In almost all styrene copolymers, including in the case of HIPS, the polymer has increased impact strength compared to styrene homopolymers due to the modification with rubber, which makes it suitable for use in applications such as housings for electrical appliances, refrigerator parts, etc. For these applications, because HIPS is also highly flammable and does not have any self-extinguishing properties, flame-retardant additives must be added to it. In order to have sufficient flame-retardancy to pass standardized fire tests such as DIN EN 60695 (analogous to UL94V), HIPS is typically used as a mixture with brominated flame-retardant additives and antimony trioxide (ATO) as a synergist. However, in order to comply with previously voluntary environmental standards, the use of antimony trioxide has recently been increasingly restricted due to its chemical hazard rating.

WO 2011/121001 A1 and WO 2012/089667 A1 describe sulfur-containing flame-retardant additives having a high sulfur content (>30%), which are used as flame-retardant synergists for phosphorus-containing flame retardants in polystyrene foams. However, these high-sulfur-containing additives are typically characterized by an intense odor and a strong, yellow to reddish-brown color, which restricts their use in many, in particular uncolored, plastics applications or makes it impossible. Furthermore, the flame-retardant additives described do not achieve an adequate flame-retardant effect in polystyrene foams when they are used alone and without phosphorous-containing flame retardants. The publications also only describe use as an additive; the combustibility of the pure materials is not mentioned.

Elementary sulfur as a flame-retardant additive in homopolystyrene is also described in WO 2011/095540 A2, which, however, only achieves its effectiveness in combination with a phosphorus-containing flame retardant. Individually, the sulfur in the form of an admixed flame-retardant additive in polystyrene foams remains almost ineffective with regard to flame retardancy. Furthermore, the addition of elemental sulfur to the final product always leads to a more or less pronounced yellow coloration, which is undesirable in many applications. The elementary sulfur in the polymer processing process and in the end product also leads to odors that are to a greater or lesser extent pronounced.

In addition to peroxides, elemental sulfur is still traditionally used as a crosslinking agent in the production of elastomeric materials and in rubber compounds. It is known that such rubbers crosslinked with sulfur have a more or less pronounced yellowing and a typical sulfur-rubber odor, which is accepted as a matter of course in many applications for elastomeric materials (e.g. in car or bicycle tires, sealing rubbers, etc.). However, if these elastomeric materials have to meet additional flame retardancy requirements, the addition of mostly considerable amounts of flame retardants (typically >10% by weight), mostly based on halogen or phosphorus, is unavoidable. Such elastomers are not used in typical applications for styrene polymers and copolymers thereof, such as building and construction as well as electrical and electronic engineering, due to the completely different material properties of these flexible, rubber-elastic materials.

WO 2017004186 A1 describes the flame-retardant effect of high-sulfur thermosets for the first time. It should be possible to use these on the one hand as an additive in polyurethane foams and on the other hand as a thermosetting material. However, these sulfur copolymers have a high sulfur content of >35% by weight. Due to the high sulfur content and the associated unpleasant odor that high-sulfur materials typically emit due to their at least in part sulfidic structure, the use of these thermosets in many plastics applications is severely restricted.

The functionality of this material is also based on the formation of a stable crust and on intumescence (foaming and adhesion). In the case of materials such as foamed polymers, which are characterized by a very large surface area in relation to mass, such flame-retardant mechanisms do not offer sufficient protection to pass standardized flammability tests. Test results regarding the fire behavior of these polymers are also missing in WO 2017004186 A1.

In addition, Zhang et al. describe in the Journal of Polymer Science, Part A 2017, 55, pages 107-116, how elementary sulfur is reacted with styrene to give polymers having a high sulfur content for use as cathode materials. However, the copolymers described are characterized not only by an extremely high sulfur content (>50% by weight) with associated strong reddish-brown coloring and odor intensity, but also have a low molecular weight of <3000 g/mol. Use as flame-retardant materials and/or molding compounds is not mentioned in the publication.

Finally, Dutkiewicz et al. describe the use of cyclotriphosphazenes as a flame-retardant compound in cotton textiles in the journal Polymer Degradation and Stability 148, (2018), pages 10-18. However, the use of cyclotriphosphazenes as a flame-retardant or flameproofing component in connection with styrene copolymers having a low sulfur content is not disclosed there.

The object of the invention is therefore to provide copolymers and/or molding compounds that have an at least flame-retardant property in combination with a low sulfur content.

According to the invention, this object is achieved by the features of independent claims 1 and 9.

Novel types of thermoplastic copolymers and/or molding compounds were found by polymerizing styrene and derivatives thereof in the presence of sulfur. These copolymers and/or molding compounds have an extremely low proportion of bonded sulfur with an intrinsic flame-retardant property.

According to the invention, a fire-retardant copolymer according to formula (1) was found with a statistical monomer distribution, wherein

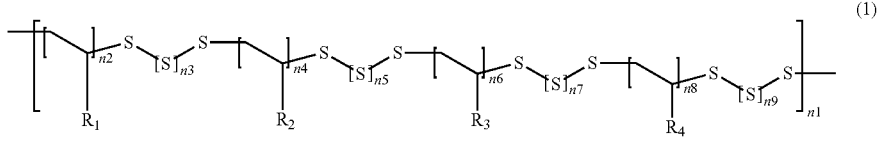

(1)

where $R_1$ to $R_4$ are equal, or at least one or more $R_1$ to $R_4$ are different from each other and $R_1$, $R_2$, $R_3$, $R_4$ are selected from groups a) to c) having the substituents, aryl, cyclohexyl, arylphosphatyl, arylphosphinyl, arylphosphonyl, arylphosphineoxidyl, cyclotriphosphazenyl, polyphosphazenyl, $C_1$-$C_{18}$-alkyl, $C_2$-$C_{18}$-alkenyl, $C_2$-$C_{18}$-alkynyl, $C_6$-$C_{12}$-aryl, $C_3$-$C_{10}$-cycloalkyl, $C_6$-$C_{12}$-aryl-$C_1$-$C_{18}$-aryl, a heteroaryl group containing one or more heteroatoms from the group N, O, P and S, O—($C_1$-$C_{18}$)-alkyl, O—($C_2$-$C_{18}$)-alkenyl, O—($C_2$-$C_{18}$)-alkynyl, O—($C_6$)-aryl, O—($C_6$-$C_{12}$)-aryl, O—($C_3$-$C_{10}$)-cycloalkyl, ($C_6$)-aryl-($C_1$-$C_{18}$)-alkyl-O, ($C_6$-$C_{12}$)-aryl-($C_1$-$C_{18}$)-alkyl-O, N—($C_1$-$C_{18}$)-alkyl, N—($C_2$-$C_{18}$)-alkenyl, N—($C_2$-$C_{18}$)-alkynyl, N—($C_6$)-aryl, N—($C_6$-$C_{12}$)-aryl, N—($C_3$-$C_{10}$)-cycloalkyl, ($C_6$)-aryl-($C_1$-$C_{18}$)-alkyl-N, ($C_6$-$C_{12}$)-aryl-($C_1$-$C_{18}$)-alkyl-N, S—($C_1$-$C_{18}$)-alkyl, S—($C_1$-$C_{18}$)-alkenyl, S—($C_2$-$C_{12}$)-alkynyl, S—($C_6$)-aryl, S—($C_6$-$C_{12}$)-aryl, S—($C_3$-$C_{10}$)-cycloalkyl, ($C_6$)-aryl-($C_1$-$C_{18}$)-alkyl-S, ($C_6$-$C_{12}$)-aryl-($C_6$-$C_{12}$)-alkyl-S, P—($C_1$-$C_{18}$)-alkyl, P—($C_2$-$C_{18}$)-alkenyl, P—($C_2$-$C_{18}$)-alkynyl, P—($C_6$)-aryl, P—($C_6$-$C_{12}$)-aryl, P—($C_3$-$C_{10}$)-cycloalkyl, ($C_6$)-aryl-($C_1$-$C_{18}$)-alkyl-P, ($C_6$-$C_{12}$)-aryl-($C_1$-$C_{18}$)-alkyl-P, OH, F, Cl, Br, H; of formula (2)

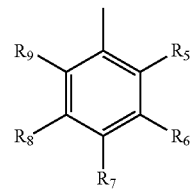

(2)

where $R_5$ to $R_9$ are equal or different from each other, comprising aryl, cyclohexyl, arylphosphatyl, arylphosphinyl, arylphosphonyl, arylphosphineoxidyl, cyclotriphosphazenyl, polyphosphazenyl, $C_1$-$C_{18}$-alkyl, $C_2$-$C_{18}$-alkenyl, $C_2$-$C_{18}$-alkynyl, $C_6$-$C_{12}$-aryl, $C_3$-$C_{10}$-cycloalkyl, $C_6$-$C_{12}$-aryl-$C_1$-$C_{18}$-alkyl, a heteroaryl group containing one or more heteroatoms from the group N, O, P and S, O—($C_1$-$C_{18}$)-alkyl, O—($C_2$-$C_{18}$)-alkenyl, O—($C_2$-$C_{18}$)-alkynyl, O—($C_6$)-aryl, O—($C_6$-$C_{12}$)-aryl, O—($C_3$-$C_{10}$)-cycloalkyl, ($C_6$)-aryl-($C_1$-$C_{18}$)-alkyl-O, ($C_6$-$C_{12}$)-aryl-($C_1$-$C_{18}$)-alkyl-O, N—($C_1$-$C_{18}$)-alkyl, N—($C_2$-$C_{18}$)-alkenyl, N—($C_2$-$C_{18}$)-alkynyl, N—($C_6$)-aryl, N—($C_6$-$C_{12}$)-aryl, N—($C_3$-$C_{10}$)-cycloalkyl, ($C_6$)-aryl-($C_1$-$C_{18}$)-alkyl-N, ($C_6$-$C_{12}$)-aryl-($C_1$-$C_{18}$)-alkyl-N, S—($C_1$-$C_{18}$)-alkyl, S—($C_1$-$C_{18}$)-alkenyl, S—($C_2$-$C_{12}$)-alkynyl, S—($C_6$)-aryl, S—($C_6$-$C_{12}$)-aryl, S—($C_3$-$C_{10}$)-cycloalkyl, ($C_6$)-aryl-($C_1$-$C_{18}$)-alkyl-S, ($C_6$-$C_{12}$)-aryl-($C_1$-$C_{18}$)-alkyl-S, P—($C_1$-$C_{18}$)-alkyl, P—($C_2$-$C_{18}$)-alkenyl, P—($C_2$-$C_{18}$)-alkynyl, P—($C_6$)-aryl, P—($C_6$-$C_{12}$)-aryl, P—($C_3$-$C_{10}$)-cycloalkyl, ($C_6$)-aryl-($C_1$-$C_{18}$)-alkyl-P, ($C_6$-$C_{12}$)-aryl-($C_1$-$C_{18}$)-alkyl-P, OH, F, Cl, Br, H, compounds of formula (3)

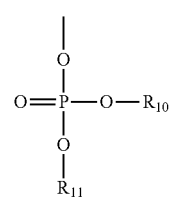

(3)

compounds of formula (4)

$$\begin{array}{c} | \\ O \\ \| \\ O=P-R_{12} \\ | \\ O \\ | \\ R_{13} \end{array} \quad (4)$$

compounds of formula (5)

$$\begin{array}{c} | \\ O \\ \| \\ O=P-R_{14} \\ | \\ R_{15} \end{array} \quad (5)$$

where $R_{10}$ to $R_{15}$ are equal or different from each other, comprising
$C_1$-$C_{18}$-alkyl, $C_2$-$C_{18}$-alkenyl, $C_2$-$C_{18}$-alkynyl, $C_6$-aryl, $C_6$-$C_{12}$-aryl, $C_3$-$C_{10}$-cycloalkyl, $C_6$-aryl $C_1$-$C_{18}$-alkyl, $C_6$-$C_{12}$-aryl-$C_1$-$C_{18}$-alkyl, a heteroaryl group containing one or more heteroatoms from the group N, O, P and S, O—($C_1$-$C_{18}$)-alkyl, O—($C_2$-$C_{18}$)-alkenyl, O—($C_2$-$C_{18}$)-alkynyl, O—($C_6$)-aryl, O—($C_6$-$C_{12}$)-aryl, O—($C_3$-$C_{10}$)-cycloalkyl, ($C_6$)-aryl-($C_1$-$C_{18}$)-alkyl-O, ($C_6$-$C_{12}$)-aryl-($C_1$-$C_{18}$)-alkyl-O, N—($C_1$-$C_{18}$)-alkyl, N—($C_2$-$C_{18}$)-alkenyl, N—($C_2$-$C_{18}$)-alkynyl, N—($C_6$)-aryl, N—($C_6$-$C_{12}$)-aryl, N—($C_3$-$C_{10}$)-cycloalkyl, ($C_6$)-aryl-($C_1$-$C_{18}$)-alkyl-N, ($C_6$-$C_{12}$)-aryl-($C_1$-$C_{18}$)-alkyl-N, S—($C_1$-$C_{18}$)-alkyl, S—($C_1$-$C_{18}$)-alkenyl, S—($C_2$-$C_{12}$)-alkynyl, S—($C_6$-$C_{12}$)-aryl, S—($C_3$-$C_{10}$)-cycloalkyl, ($C_6$)-aryl-($C_1$-$C_{18}$)-alkyl-S, ($C_6$-$C_{12}$)-aryl-($C_1$-$C_{18}$)-alkyl-S, P—($C_1$-$C_{18}$)-alkyl, P—($C_2$-$C_{18}$)-alkenyl, P—($C_2$-$C_{18}$)-alkynyl, P—($C_6$)-aryl, P—($C_6$-$C_{12}$)-aryl, P—($C_3$-$C_{10}$)-cycloalkyl, ($C_6$)-aryl-($C_1$-$C_{18}$)-alkyl-P, ($C_6$-$C_{12}$)-aryl-($C_1$-$C_{18}$)-alkyl-P, OH, F, Cl, Br, H; of formula 6, $$\begin{array}{c}\text{(structure 6)}\end{array} \quad (6)$$

where $R_{16}$ to $R_{20}$ are equal or different from each other, comprising
$C_1$-$C_{18}$-alkyl, $C_2$-$C_{18}$-alkenyl, $C_2$-$C_{18}$-alkynyl, $C_6$-aryl, $C_6$-$C_{12}$-aryl, $C_3$-$C_{10}$-cycloalkyl, $C_6$-aryl-$C_1$-$C_{18}$-alkyl, $C_6$-$C_{12}$-aryl-$C_1$-$C_{18}$-alkyl, a heteroaryl group containing one or more heteroatoms from the group N, O, P and S, O—($C_1$-$C_{18}$)-alkyl, O—($C_2$-$C_{18}$)-alkenyl, O—($C_2$-$C_{18}$)-alkynyl, O—($C_6$)-aryl, O—($C_6$-$C_{12}$)-aryl, O—($C_3$-$C_{10}$)-cycloalkyl, ($C_6$)-aryl-($C_1$-$C_{18}$)-alkyl-O, ($C_6$-$C_{12}$)-aryl)-($C_1$-$C_{18}$)-alkyl-O, N—($C_1$-$C_{18}$)-alkyl, N—($C_2$-$C_{18}$)-alkenyl, N—($C_2$-$C_{18}$)-alkynyl, N—($C_6$)-aryl, N—($C_6$-$C_{12}$)-aryl, N—($C_3$-$C_{10}$)-cycloalkyl, ($C_6$)-aryl-($C_1$-$C_{18}$)-alkyl-N, ($C_6$-$C_{12}$)-aryl-($C_1$-$C_{18}$)-alkyl-N, S—($C_1$-$C_{18}$)-alkyl, S—($C_1$-$C_{18}$)-alkenyl, S—($C_2$-$C_{12}$)-alkynyl, S—($C_6$-$C_{12}$)-aryl, S—($C_3$-$C_{10}$)-cycloalkyl, ($C_6$)-aryl-($C_1$-$C_{18}$)-alkyl-S, ($C_6$-$C_{12}$)-aryl-($C_1$-$C_{18}$)-alkyl-S, P—($C_1$-$C_{18}$)-alkyl, P—($C_2$-$C_{18}$)-alkenyl, P—($C_2$-$C_{18}$)-alkynyl, P—($C_6$)-aryl, P—($C_6$-$C_{12}$)-aryl, P—($C_3$-$C_{10}$)-cycloalkyl, ($C_6$)-aryl-($C_1$-$C_{18}$)-alkyl-P, ($C_6$-$C_{12}$)-aryl-($C_1$-$C_{18}$)-alkyl-P, OH, F, Cl, Br, H;
wherein $n_1$=1-100,000
$n_2$=0-10,000
$n_3$=0-10,000
$n_4$=0-10,000
$n_5$=0-10,000
$n_6$=0-10,000
$n_7$=0-10,000
$n_8$=0-10,000
$n_9$=0-10,000 and the sulfur content is ≤10% within the flame-retardant copolymer.

With the definition that $R_1$ to $R_4$ can be equal or at least one or more $R_1$ to $R_4$ can be different from one another, a permutation for a combination with repetition of n objects without regard to the order for k should comprise assignments with $$\frac{(n+k-1)!}{(n-1)!k!},$$

wherein objects can also be selected multiple times, for example by selecting $R_1$=$R_2$=$R_3$=$R_4$ or $R_1$≠$R_2$≠$R_3$≠$R_4$ or $R_1$=$R_2$≠$R_3$≠$R_4$ or $R_1$=$R_3$≠$R_4$ or $R_1$≠$R_2$=$R_3$=$R_4$ or $R_1$≠$R_2$≠$R_3$=$R_4$ or $R_1$=$R_2$≠$R_3$=$R_4$ or $R_3$=$R_2$≠$R_1$=$R_4$ or $R_3$=$R_2$≠$R_1$≠$R_4$ or $R_3$≠$R_1$=$R_4$ or $R_1$=$R_3$≠$R_2$=$R_4$ or $R_1$=$R_3$≠$R_2$≠$R_4$ or $R_1$=$R_3$≠$R_2$≠$R_4$ or $R_2$≠$R_{13}$=$R_4$ or $R_2$≠$R_1$=$R_3$≠$R_4$ or $R_4$=$R_2$≠$R_1$≠$R_3$.

In a preferred embodiment, a fire-retardant copolymer built up from the formulas 1 to 6 having a sulfur content of ≤10% was found, wherein
$n_1$=1-1000
$n_2$=0-500
$n_3$=0-1
$n_4$=0-500
$n_5$=0-1
$n_6$=0-500
$n_7$=0-1
$n_8$=0-500
$n_9$=0-1.

The copolymers formed according to formulas 1 to 6 and/or molding compounds formed therefrom are substantially colorless and/or odorless.

For the purposes of the application, substantially colorless is to be understood as meaning the absence of visible colorations. These colorations correspond to the perceived RAL color types, including but not limited to RAL 1013 Oyster white, RAL 9001 Cream, RAL 9003 Signal white, RAL 9010 Pure white and/or RAL 9016 Traffic white.

Odorless can mean the olfactory perception of sulfide compounds of less than 50 µg/m³ of air (e.g. sulfur dioxide), preferably less than 5 µg/m³ of air (e.g. hydrogen sulfide, dimethyl sulfide, methyl mercaptan), particularly preferably less than 0.5 µg/m³ of air (e.g. thiophenol, thiocresol, diphenyl sulfide, propyl mercaptan, ethyl mercaptan, crotyl mercaptan, amyl mercaptan, benzyl mercaptan, amyl mercaptan, allyl mercaptan), wherein the sulfide compounds have a different odor threshold depending on their chemical structure and typically being able to be perceived differently from individual to individual.

A copolymer formed from the formulas 1 to 6 can form a single component of a molding compound or can be a co-component of a molding compound. According to the definition, the term "molding compound" should be understood to mean workpieces containing copolymers, which form a molding material for producing molded bodies or semi-finished products or finished parts. The molding compound is processed into semi-finished or finished parts by means of mechanical force and/or an increased temperature by means of shaping such as pressing, transfer molding or injection molding in molds and subsequent cooling. By way of example, but not exclusively, the copolymers of the formulas CP1 to CP4 can be individual components or co-components of a molding compound. In this respect, the molding compound can contain a single copolymer or other polymers and/or copolymers and/or additives.

A molding material formed from a molding compound has at least a flame-retardant effect on contact with a flame or, depending on the substituents, is self-extinguishing. The copolymers and/or molding compounds according to the invention are free from antimony trioxide and can be obtained free from halogen-containing components.

In particular, compounds comprising copolymers having a random monomer distribution of the formula (7) have been found

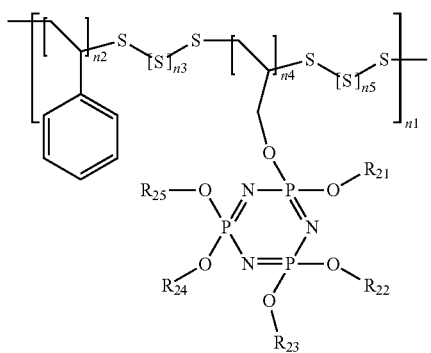

(7)

wherein
$n_1$=1-1000
$n_2$=0-500
$n_3$=0-1
$n_4$=0-500
$n_5$=0-1
and $R_{21}$ to $R_{25}$ are equal or different and comprise
a polymer according to formula (1) and/or
a substituent of the allyloxy ($C_3H_6O$) type.

Furthermore, compounds comprising copolymers having a random monomer distribution of the formula (8) have been found, wherein

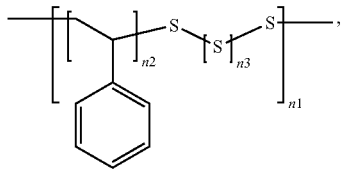

(8)

$n_1$=1-1000
$n_2$=0-500
$n_3$=0-1

Compounds comprising copolymers having a statistical monomer distribution of the formula (9) have also been found, in which case the substituent $R_{26}$ can be localized in the ortho, meta and/or para position relative to the monomer chain on the phenyl ring,

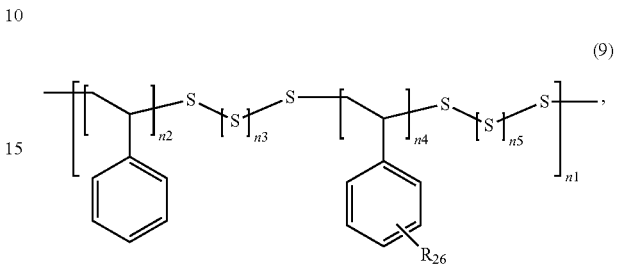

(9)

wherein
$n_1$=1-1000
$n_2$=0-500
$n_3$=0-1
$n_4$=0-500
$n_5$=0-1 and
wherein $R_{26}$ comprises
a polymer according to formula (1) or
a vinyl-type substituent.

The copolymers according to the invention are already flame-retardant and/or self-extinguishing as individual compounds or as components of molding compounds. The flame-retardant property can be further enhanced by adding a phosphorus-based flame-retardant additive to the copolymer, for example 2,4,8,10-tetraoxa-3,9-diphosphaspiro [5,5] undecane-3,9-dimethyl-3,9-dioxide (0.1-10% by weight) or hexaphenoxycyclotriphosphazenes (0.5-20% by weight). In particular, it was found that copolymers and/or molding compounds of the formula (7) with additions of the phosphorus-based flame-retardant additives mentioned by way of example within the range of 4.5% by weight are flame-retardant and/or self-extinguishing.

Furthermore, fire-retardant molding compounds for polymerization or extrusion have been found that have at least one fire-retardant copolymer having a sulfur content of less than 10%.

Due to the thermoplastic properties of the copolymers and/or molding compounds, a large number of applications can be covered by a wide variety of shaping. Because foam bodies can also be produced as molding material from the copolymers and/or molding compounds, they can be used, for example, as thermal insulation materials.

Furthermore, further flame retardants such as melamine, melamine cyanurates, metal oxides, metal hydroxides, phosphates, phosphinates or expanded graphite can also be used in the copolymer molding compounds. Suitable additional halogen-free flame retardants are commercially available, for example under the name Exolit OP 930, Exolit OP 1312, DOPO, HCA-HQ, Cyagard RF-1241, Cyagard RF-1243, Fyrol PMP, aluminum hypophosphite, melamine polyphosphate, melamine cyanurate and ammonium polyphosphate.

The fire-retardant copolymers and foams made therefrom preferably have a density within the range of 5 to 200 kg/m³, particularly preferably within the range of 10 to 100 kg/m³, and are preferably more than 80%, particularly preferably closed cell to an extent of 95 to 100%.

The polymer matrix of the fire-retardant copolymers and copolymer foams preferably consists of thermoplastic (co)polymers or polymer mixtures, in particular styrene (co)polymers. The fire-retardant and expandable styrene (co)polymers (EPS) and styrene (co)polymer extrusion foams (XPS) according to the invention can be processed into expandable granules (EPS) by mixing a blowing agent into the polymer melt and subsequent extrusion and granulation under pressure or into foam panels (XPS) or foam strands by means of extrusion and expansion using appropriately shaped nozzles.

Expandable styrene (co)polymers (EPS) are understood to mean styrene (co)polymers containing blowing agents. The EPS particle size is preferably within the range of 0.2-2 mm. Styrene (co)polymer particle foams can be obtained by prefoaming and sintering the corresponding, expandable styrene (co)polymers (EPS).

The styrene (co)polymer particle foams preferably have 2 to 15 cells per millimeter.

The copolymers according to the invention or the copolymer-containing molding compounds according to the invention can also be added to other styrene polymers, e.g. crystal-clear polystyrene (GPPS), high-impact polystyrene (HIPS), anionically polymerized polystyrene or high-impact polystyrene (A-IPS), styrene-α-methylstyrene copolymers, acrylonitrile-butadiene-styrene polymers (ABS), styrene-acrylonitrile polymer (SAN), poly-acrylonitrile-styrene-acrylic ester (ASA), polystyrene acrylates such as polystyrene methyl acrylate (SMA) and polystyrene methyl methacrylate (SMMA), methyl acrylate butadiene styrene copolymers (MBS), methyl methacrylate-acrylonitrile-butadiene-styrene polymers (MABS), styrene-N-phenylmaleimide copolymers (SPMI) or mixtures thereof or mixtures of said styrene (co)polymers with polyolefins such as polyethylene or polypropylene and polyphenylene ether (PPE).

To improve the mechanical properties or the temperature resistance, the styrene copolymers mentioned can, optionally using compatibilizers, be added to thermoplastic polymers such as polyamides (PA), polyolefins such as polypropylene (PP) or polyethylene (PE), polyacrylates such as polymethylmethacrylate (PMMA), polycarbonate (PC), polyesters such as polyethylene terephthalate (PET) or polybutylene terephthalate (PBT), polyether sulfones (PES), polyether ketones or polyether sulfides (PES) or mixtures thereof, usually in proportions totaling up to a maximum of 30% by weight, preferably within the range of 1 to 10% by weight based on the polymer melt. Furthermore, mixtures within the quantity ranges mentioned are also possible with, for example, hydrophobically modified or functionalized polymers or oligomers, rubbers such as polyacrylates or polydienes such as styrene-butadiene block copolymers or biodegradable, aliphatic or aliphatic/aromatic copolyesters.

Suitable compatibilizers are, for example, styrene copolymers modified with maleic anhydride, epoxy-containing polymers or organosilanes.

In the production method, the styrene copolymers can also be mixed with polymer recyclates of the thermoplastic polymers mentioned, in particular styrene (co)polymers and expandable styrene (co)polymers (EPS) in amounts of at most 50% by weight, in particular in amounts of 1 to 20% by weight, without significantly changing the flame-retardant or self-extinguishing properties of the copolymers and/or molding compounds.

Mixtures of SMA and SAN or SAN and SPMI are preferably used for high-temperature-resistant foams. The content is selected according to the desired heat resistance.

The acrylonitrile content in SAN is preferably 25 to 33% by weight. The methacrylate content in SMA is preferably 25 to 30% by weight.

The styrene (co)polymers can contain the customary and known auxiliaries and additives, for example flame retardants, fillers, nucleating agents, UV stabilizers, chain transfer agents, blowing agents, plasticizers, antioxidants, soluble and insoluble inorganic and/or organic dyes and pigments, for example infrared (IR) absorbers such as carbon black, graphite or aluminum powder. As a rule, the dyes and pigments are added in amounts within the range of 0.01 to 30% by weight, preferably within the range of 1 to 5% by weight. In order to obtain homogeneous and microdispersed distribution of the pigments in the styrene copolymer, it can be expedient, in particular in the case of polar pigments, to use a dispersing agent, e.g. organosilanes, polymers containing epoxy groups or maleic anhydride-grafted styrene polymers. Preferred plasticizers are mineral oils and phthalates, which can be used in amounts of 0.05 to 10% by weight, based on the styrene (co)polymer.

The amount of IR absorbers used depends on their type and effect. The styrene (co)polymer particle foams preferably contain 0.5 to 5% by weight, particularly preferably 1 to 4% by weight, of IR absorbers. Graphite, carbon black or aluminum having an average particle size within the range of 1 to 50 m is preferably used as IR absorber.

The graphite preferably used preferably has an average particle size of 1 to 50 μm, in particular from 2.5 to 12 μm, a bulk density of 100 to 500 kg/m$^3$ and a specific surface area of 5 to 20 m$^2$/g. Natural graphite or ground, synthetic graphite can be used. The graphite particles are preferably present in the styrene (co)polymer in amounts of 0.05 to 8% by weight, in particular 0.1 to 5% by weight.

One problem with the use of graphite particles is the ready flammability of the styrene (co)polymer particle foams containing graphite particles. To pass the fire tests required for use in construction (B1 and B2 according to DIN 4102), the abovementioned flame retardants can be added to the expandable styrene (co)polymers according to the invention. Surprisingly, these flame retardants do not lead to any impairment of the mechanical properties of the polystyrene (co)polymer particle foams containing carbon black or graphite.

The particularly preferred expandable styrene (co)polymers (EPS) can be produced by means of various methods.

In one embodiment, athermanous particles and a nonionic surfactant are mixed with a melt of the styrene (co)polymer, preferably in an extruder. At the same time, the blowing agent is metered into the melt. Athermanous particles are understood to mean particles that are impermeable to infrared radiation (heat radiation).

The athermanous particles can also be incorporated into a melt of styrene (co)polymer containing a blowing agent, wherein it is expedient to use screened edge fractions of a bead spectrum of blowing agent-containing polystyrene beads formed in a suspension polymerization. The blowing agent and the styrene (co)polymer melts containing athermanous particles are pressed out and comminuted to form blowing agent-containing granules. Because the athermanous particles can have a strong nucleating effect, they should be cooled under pressure quickly after pressing in order to avoid foaming. It is therefore expedient to carry out underwater granulation under pressure in a closed system.

It is also possible to add the blowing agent to the styrene (co)polymers that contain athermanous particles in a separate method step. Here, the granules are then preferably impregnated with the blowing agent in an aqueous suspension.

In all three cases, the fine, athermanous particles and the nonionic surfactant can be added directly to a styrene (co)polymer melt. However, the athermanous particles can also be added to the melt in the form of a concentrate in polystyrene. Preferably, however, styrene (co)polymer granules and athermanous particles are fed together into an extruder, where the styrene (co)polymer is melted and mixed with the athermanous particles.

The expandable styrene (co)polymers (EPS) are particularly preferably prepared by polymerizing styrene and, optionally, the copolymerizable monomers of the copolymers according to the invention in an aqueous suspension and impregnation with a blowing agent, wherein the polymerization is carried out in the presence of 0.1 to 5% by weight of graphite particles based on the styrene (co) polymer and a nonionic surfactant. Suitable nonionic surfactants are, for example, maleic anhydride copolymers (MA), for example from maleic anhydride and $C_{20-24}$ olefin, polyisobutylene succinic anhydride (PIBSA) or reaction products thereof with hydroxy polyethylene glycol ester, diethylaminoethanol or amines such as tridecylamine, octylamine or polyetheramine, tetraethylenepentamine or mixtures thereof. The molecular weights of the nonionic surfactant are preferably within the range of 500 to 3000 g/mol. They are generally used in amounts ranging from 0.01 to 2% by weight based on the styrene (co)polymer.

The styrene (co)polymers containing expandable, athermanous particles can be processed into styrene (co)polymer foams having densities of 5-200 kg/m$^3$, preferably 7 to 100 kg/m$^3$ and in particular 10-80 kg/m$^3$.

For this purpose, the expandable particles are pre-foamed. This is usually done by heating the particles with water vapor in what are referred to as prefoamers. The particles prefoamed in this way are then welded to form molded bodies. For this purpose, the prefoamed particles are placed in non-gastight molds and treated with water vapor. After cooling, the molded parts can be removed.

The foams produced from the expandable styrene (co) polymers according to the invention are distinguished by excellent thermal insulation. This effect is particularly evident at low densities.

The foams can be used for thermal insulation of buildings and parts of buildings, for thermal insulation of machines and household appliances, and as packaging materials.

To produce the expandable styrene (co)polymers, the blowing agent can be mixed into the polymer melt. One possible method comprises the steps of a) melt production, b) mixing, c) cooling, d) conveying and e) granulating. Each of these stages can be carried out by the apparatus or apparatus combinations known in plastics processing. Static or dynamic mixers, for example extruders, are suitable for mixing. The polymer melt can be taken directly from a polymerization reactor or produced directly in the mixing extruder or a separate melting extruder by melting polymer granules. The melt can be cooled in the mixing units or in separate coolers. For the granulation, for example, pressurized underwater granulation, granulation with rotating blades and cooling by spray nebulization of temperature control liquids or atomization granulation come into consideration. Apparatus arrangements suitable for carrying out the method are, for example:
 a) polymerization reactor—static mixer/cooler—granulator
 b) polymerization reactor—extruder—granulator
 c) extruder—static mixer—granulator
 d) extruder—granulator The blowing agent-containing styrene (co)polymer melt is generally conveyed through the nozzle plate at a temperature within the range of 140 to 300° C., preferably within the range of 160 to 240° C. Cooling down to the glass transition temperature range is not necessary.

The nozzle plate is heated to at least the temperature of the blowing agent-containing styrene (co)polymer melt. The temperature of the nozzle plate is preferably within the range of 20 to 100° C. above the temperature of the blowing agent-containing styrene (co)polymer melt. This prevents polymer deposits in the nozzles and ensures trouble-free granulation.

In order to obtain marketable granule sizes, the diameter (D) of the nozzle bores at the nozzle outlet should be within the range of 0.2 to 1.5 mm, preferably within the range of 0.3 to 1.2 mm, particularly preferably within the range of 0.3 to 0.8 mm. In this way, granule sizes of less than 2 mm, in particular within the range of 0.4 to 1.4 mm, can be set in a targeted manner even after strand expansion.

A method for producing fire-retardant, expandable styrene (co)polymers (EPS) that comprises the following steps is particularly preferred:
 a) mixing an organic blowing agent into the polymer melt of the copolymers according to the invention and/or mixtures thereof by means of static or dynamic mixers at a temperature of at least 150° C.,
 b) cooling the blowing agent styrene (co)polymer melt to a temperature of 120 to 200° C.
 c) discharging through a nozzle plate having holes whose diameter at the nozzle outlet is at most 1.5 mm and
 d) granulating the blowing agent-containing melt directly behind the nozzle plate under water at a pressure within the range of 1 to 20 bar.

It is also possible to produce the copolymers and/or molding compounds according to the invention by means of suspension polymerization. In suspension polymerization, styrene and sulfur alone are preferably used as monomers. However, up to 50% of the weight of the compound can be replaced by other ethylenically unsaturated monomers.

In suspension polymerization, the usual auxiliaries, such as peroxide initiators, suspension stabilizers, blowing agents, chain transfer agents, expansion aids, nucleating agents and plasticizers, can be added. Blowing agents are added in amounts of 3 to 10% by weight based on the monomer(s). They can be added to the suspension before, during or after polymerization. Suitable blowing agents are aliphatic hydrocarbons having 4 to 6 carbon atoms. It is advantageous to use inorganic Pickering dispersants such as magnesium pyrophosphate or calcium phosphate as suspension stabilizers.

The suspension polymerization produces bead-shaped, substantially round particles having an average diameter within the range of 0.2 to 2 mm.

To improve processability, the finished, expandable styrene(co)polymer beads and granules can be coated with customary and known coating agents such as, for example, metal stearates, glycerol esters and fine-particle silicates, antistatic agents or anti-caking agents.

The EPS granules can be mixed with glycerol monostearate (GMS, typically 0.25% by weight), glycerol tristearate (typically 0.25% by weight), fine-particle silica (Aerosil R972, typically 0.12% by weight) and zinc stearate (typically 0.15% by weight) and an antistatic agent.

In a first step, the expandable styrene (co)polymer particles according to the invention can be prefoamed by means of hot air or water vapor to give foam particles having a density within the range of 20 to 500 kg/m³, in particular 10 to 100 kg/m³, and in a second step the material can be fused in a closed mold to give molded foams.

The expandable styrene (co)polymer particles can be processed into polystyrene foams having densities of 8 to 200 kg/m³, preferably 10 to 100 kg/m³. For this purpose, the expandable particles are pre-foamed. This is usually done by heating the particles with water vapor in what are referred to as prefoamers. The particles prefoamed in this way are then welded to form semi-finished products or molded bodies. For this purpose, the prefoamed particles are placed in non-gastight molds and treated with water vapor. After cooling, the molded parts can be removed.

EXAMPLES

Syntheses:
Materials Used:
Styrene (99%, Acros Organics/catalyst removed), sulfur (>99%, Alfa Aesar), divinylbenzene (Merck KGaA, contains 25-50% ethyl styrene) and hexakisallyloxycyclotriphosphazene (synthetically accessible according to M. Dutkiewicz et al., Polymer Degradation and Stability 2018, 148, 10-18) were used for the syntheses carried out.

Copolymer CP1: poly-S(1%)-sty(99%)

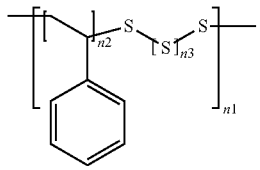

where
$n_1$=1-1000
$n_2$=0-500
$n_3$=0-1.

Sulfur (50 mg, 1% by weight) and styrene (4950 mg, 99% by weight) were mixed together and deoxygenated by means of three freeze-thaw cycles. The mixture was heated at 130° C. for 72 hours. After dissolving in tetrahydrofuran (THF), the product was isolated by means of precipitation in methanol.
EA: C (%)=91.6; H (%)=7.69; S (%)=0.86;
TGA: $Td_{5\%}$ (° C.)=367;
DSC: $T_g$(° C.)=95;
GPS: $M_w$(kDa)=48; $M_n$ (kDa)=20.
Copolymer CP2: poly-S(0.5%)-sty(99.5%)

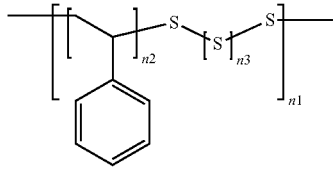

where $n_1$=1-1000
$n_2$=0-500
$n_3$=0-1.

Sulfur (25 mg, 0.5% by weight) and styrene (4975 mg, 99.5% by weight) were mixed together and deoxygenated by means of three freeze-thaw cycles. The mixture was heated at 130° C. for 72 hours. After dissolving in THF, the product was isolated by means of precipitation in methanol.
EA: C (%)=92.0; H (%)=7.67; S (%)=0.47;
TGA: $Td_{5\%}$ (° C.)=375;
DSC: $T_g$(° C.)=101;
GPS: $M_w$(kDa)=128; $M_n$(kDa)=66;
Copolymer CP3: poly-S(1%)-sty(98%)-DVB(1%)

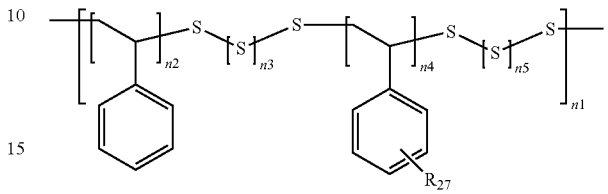

wherein
$n_1$=1-1000
$n_2$=0-500
$n_3$=0-1
$n_4$=0-500
$n_5$=0-1 and
wherein $R_{27}$ comprises
a polymer according to formula (1) or
a substituent of the vinyl type, in each case in an ortho, meta or para position relative to the monomer chain.

Sulfur (50 mg, 1% by weight), styrene (4900 mg, 98% by weight) and divinylbenzene (50 mg, 1% by weight) were mixed together and deoxygenated by means of three freeze-thaw cycles. The mixture was heated at 130° C. for 72 hours. After dissolving in THF, the product was isolated by means of precipitation in methanol.
EA: C (%)=91.7; H (%)=8.20;
TGA: $Td_{5\%}$ (° C.)=343;
DSC: $T_g$(° C.)=93;
GPS: $M_w$(kDa)=387; $M_n$ (kDa)=18;
Copolymer CP4 poly-S(1)-sty(96)-CTP(3)

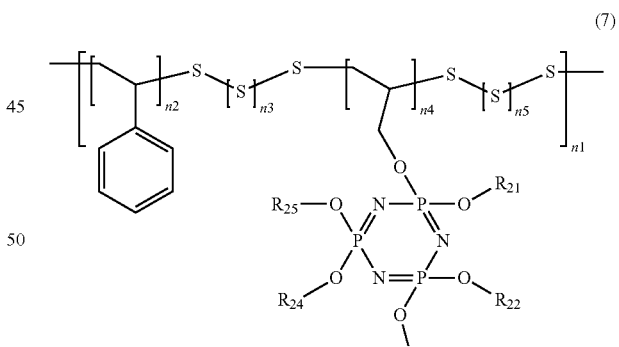

(7)

where
$n_1$=1-1000
$n_2$=0-500
$n_3$=0-1
$n_4$=0-500
$n_5$=0-1 and
$R_{21}$ to $R_{25}$ are equal or different and comprise a polymer according to formula (1) and/or a substituent of the allyloxy ($C_3H_6O$) type.

Sulfur (50 mg, 1% by weight), styrene (4800 mg, 96% by weight) and hexakisallyloxycyclotriphosphazene (150 mg, 3% by weight) were mixed together and deoxygenated by means of three freeze-thaw cycles. The mixture was heated at 130° C. for 72 hours. After dissolving in THF, the product was isolated by means of precipitation in methanol.
EA: C (%)=90.5; H (%)=8.18; S (%)=0.23; N (%)=0.24;
TGA: $Td_{5\%}$ (° C.)=304;
DSC: $T_g$(° C.)=82;
GPS: $M_w$(kDa)=70; $M_n$(kDa)=32.

Polymers and additives used for producing fire-retardant molding compounds:

| Polymer/additive | Type and manufacturer | Abbreviation |
|---|---|---|
| Polystyrene | Polystyrene 158K, BASF SE, Ludwigshafen, Germany | PS |
| 2,4,8,10-tetraoxa-3,9-diphosphaspiro [5.5] undecane-3,9-dimethyl-3,9-dioxides | aflammite PCO 900, Thor GmbH, Speyer, Germany | P1 |
| hexaphenoxycyclotriphosphazenes | abcr GmbH, Karlsruhe, Germany | P2 |

Production of the Fire Test Specimens

VB1 and VB4:

First, 20 g of PS were dissolved in dichloromethane. The solution was then poured into a 20 cm×10 cm aluminum mold and dried at room temperature (RT) for 24 hours. The dried polymer was removed from the aluminum mold and foamed with water vapor in a perforated stainless steel mold for 20 minutes. The foamed test body was dried to constant mass for 24 hours at 50° C. The resulting test bodies have a density of approx. 70 kg/m³.

VB2 and VB5:

First, 20 g of PS and 0.5 g of P1 were dissolved in dichloromethane. The solution was then poured into a 20 cm×10 cm aluminum mold and dried at room temperature (RT) for 24 hours. The dried compound was removed from the aluminum mold and foamed with water vapor in a perforated stainless steel mold for 20 minutes. The foamed test body was dried to constant mass for 24 hours at 50° C. The resulting test bodies have a density of approx. 70 kg/m³.

VB3 and VB6:

First, 20 g of PS and 0.95 g of P2 were dissolved in dichloromethane. The solution was then poured into a 20 cm×10 cm aluminum mold and dried at room temperature (RT) for 24 hours. The dried compound was removed from the aluminum mold and foamed with water vapor in a perforated stainless steel mold for 20 minutes. The foamed test body was dried to constant mass for 24 hours at 50° C. The resulting test bodies have a density of approx. 70 kg/m³.

EB1:

First, 20 g of CP1 were dissolved in dichloromethane. The solution was then poured into a 20 cm×10 cm aluminum mold and dried at room temperature (RT) for 24 hours. The dried copolymer was removed from the aluminum mold and foamed with water vapor in a perforated stainless steel mold for 20 minutes. The foamed test body was dried to constant mass for 24 hours at 50° C. The resulting test bodies have a density of approx. 70 kg/m³.

EB2 and EB7:

First, 20 g of CP1 and 0.95 g of P2 were dissolved in dichloromethane. The solution was then poured into a 20 cm×10 cm aluminum mold and dried at room temperature (RT) for 24 hours. The dried compound was removed from the aluminum mold and foamed with water vapor in a perforated stainless steel mold for 20 minutes. The foamed test body was dried to constant mass for 24 hours at 50° C. The resulting test bodies have a density of approx. 70 kg/m³.

EB3:

First, 20 g of CP2 were dissolved in dichloromethane. The solution was then poured into a 20 cm×10 cm aluminum mold and dried at room temperature (RT) for 24 hours. The dried copolymer was removed from the aluminum mold and foamed with water vapor in a perforated stainless steel mold for 20 minutes. The foamed test body was dried to constant mass for 24 hours at 50° C. The resulting test bodies have a density of approx. 70 kg/m³.

EB4:

First, 20 g of CP2 and 0.5 g of P1 were dissolved in dichloromethane. The solution was then poured into a 20 cm×10 cm aluminum mold and dried at room temperature (RT) for 24 hours. The dried compound was removed from the aluminum mold and foamed with water vapor in a perforated stainless steel mold for 20 minutes. The foamed test body was dried to constant mass for 24 hours at 50° C. The resulting test bodies have a density of approx. 70 kg/m³.

EB5 and EB8:

First, 20 g of CP3 were dissolved in dichloromethane. The solution was then poured into a 20 cm×10 cm aluminum mold and dried at room temperature (RT) for 24 hours. The dried copolymer was removed from the aluminum mold and foamed with water vapor in a perforated stainless steel mold for 20 minutes. The foamed test body was dried to constant mass for 24 hours at 50° C. The resulting test bodies have a density of approx. 70 kg/m³.

EB6 and EB9:

First, 20 g of CP4 were dissolved in dichloromethane. The solution was then poured into a 20 cm×10 cm aluminum mold and dried at room temperature (RT) for 24 hours. The dried copolymer was removed from the aluminum mold and foamed with water vapor in a perforated stainless steel mold for 20 minutes. The foamed test body was dried to constant mass for 24 hours at 50° C. The resulting test bodies have a density of approx. 70 kg/m³.

Carrying Out the Fire Tests

Screening Test:

A 5 cm×10 cm×1 cm strip of the foam body was held for a few seconds in a 2 cm high propane gas flame having an energy of approx. 50 kW. As soon as the sample ignited, but after a maximum of 5 seconds, it was pulled out of the flame and the ignitability and self-extinguishing of the sample were recorded. Self-extinguishing is understood to mean the following behavior in the screening test: The specimen ignited by the flame of the burner extinguishes within 5 seconds after the burner flame has been removed from the specimen.

Fire Test According to DIN 4102-2 (B2):

A 20 cm×10 cm×1 cm sample was exposed to a flame having an energy of approx. 50 kW and a flame height of 2 cm at a vertical distance of 1 cm from the underside of the sample for 15 seconds. The afterburn time, flame height, self-extinguishing and burning dripping behavior of the sample were noted.

Elemental Analysis:

The elemental composition of the samples was measured using a vario MICRO cube (Elementar Analysesysteme GmbH, Langenselbold). The measurement method was calibrated with sulfanilamide.

Gel Permeation Chromatography:

The molecular weight and the molecular weight distribution of the samples were measured with a GPC analysis system from Shimadzu (Kyoto, Japan) consisting of a degasser (DGU-20A$_{3R}$), two pumps (LC-20AD), an autosampler (SIL-20A$_{HT}$), a column oven (CTO-20A, 30° C.), a diode array detector (SPD-M20A, 30° C.), a refractive index detector (RID-20A, 30° C.), a control unit (CBM-20A) and a column set (PSS Polymer Standard Services GmbH, Mainz—a pre-column SDV 50×8 mm, 5 µm, two separation columns SDV 300×8 mm, 5 µm, 1000 Å, one separation column SDV 300×8 mm, 5 µm, 100,000 Å). Calibration was performed using polystyrene standards.

The elemental composition, molecular weights and distributions, and thermal characteristics of the synthesized copolymers are shown in Tables 1 and 2 below.

TABLE 1

Elementary composition of the synthesized copolymers:

| Sample | C (%)[1] | H (%)[1] | S (%)[1] | N (%)[1] |
|---|---|---|---|---|
| PS | 92.3[2] | 7.74[2] | 0.00[2] | 0.00[2] |
| CP1 | 91.6 | 7.69 | 0.86 | 0.00 |
| CP2 | 92.0 | 7.67 | 0.47 | 0.00 |
| CP3 | 91.7 | 8.20 | 0.00 | 0.00 |
| CP4 | 90.5 | 8.18 | 0.23 | 0.24 |

[1]percentage-based elemental composition determined by means of elemental analysis,
[2]theoretically calculated value

TABLE 2

Molecular weights and distributions and thermal characteristics of the copolymers:

| Sample | Mn[1] (kDa) | Mw[1] (kDa) | Đ[1] | Td$_{5\%}$[2] (° C.) | Tg[3] (° C.) |
|---|---|---|---|---|---|
| PS | 144 | 257 | 1.78 | 386 | 101 |
| CP1 | 20 | 48 | 2.36 | 367 | 95 |
| CP2 | 66 | 128 | 1.93 | 375 | 101 |
| CP3 | 18 | 387 | 20.98 | 343 | 93 |
| CP4 | 32 | 70 | 2.19 | 304 | 82 |

[1]average molecular weights and their molecular weight distribution determined by means of GPC,
[2]decomposition temperature at 5% mass loss determined by means of TGA,
[3]onset of glass transition temperature determined by means of DSC.

Fire Test Results:
A. Screening Test:

TABLE 3

| Example | Composition | Content of (co)polymer (phr[1]) | Content of P1 or P2 (phr[1]) | Self-extinguishing (yes/no) |
|---|---|---|---|---|
| VB1 | PS | 100 | — | no |
| VB2 | PS + P1 | 100 | 2.50 | no |
| VB3 | PS + P2 | 100 | 4.75 | no |
| EB1 | CP1 | 100 | — | yes |
| EB2 | CP1 + P2 | 100 | 4.75 | yes |
| EB3 | CP2 | 100 | — | no |
| EB4 | CP2 + P1 | 100 | 2.50 | yes |

TABLE 3-continued

| Example | Composition | Content of (co)polymer (phr[1]) | Content of P1 or P2 (phr[1]) | Self-extinguishing (yes/no) |
|---|---|---|---|---|
| EB5 | CP3 | 100 | — | no |
| EB6 | CP4 | 100 | — | yes |

[1]parts per hundred rubber

B. Small Burner Test According to DIN 4102-2 (B32):

TABLE 4

| Example | Composition | Content of (co)polymer (phr[1]) | Content of P1 or P2 (phr[1]) | Flame height (cm) | Afterburn time (s) |
|---|---|---|---|---|---|
| VB4 | PS | 100 | — | >15 | 31 |
| VB5 | PS + P1 | 100 | 2.50 | >15 | 35 |
| VB6 | PS + P2 | 100 | 4.75 | >15 | 22 |
| EB7 | CP1 + P2 | 100 | 4.75 | 9 | 0 |
| EB8 | CP3 | 100 | — | >15 | 23 |
| EB9 | CP4 | 100 | — | 12 | 12.8 |

[1]parts per hundred rubber

The invention claimed is:

1. A fire-retardant copolymer given by formula (7)

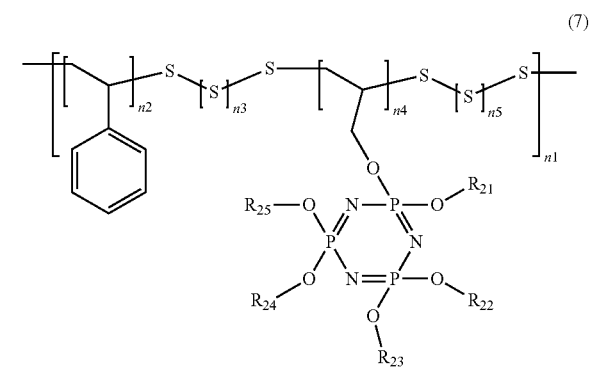

(7)

wherein:
m=1-1000;
$n_2$=1-500;
$n_3$=0-1;
$n_4$=1-500;
$n_5$=0-1;
$R^{21}$ to $R^{25}$ are each allyloxy ($C_3H_6O$); and
wherein the fire-retardant copolymer comprises a sulfur content of less than or equal to 10% by weight of the fire-retardant copolymer.

2. The fire-retardant copolymer according to claim 1, wherein the fire-retardant copolymer comprises a colorlessness, the colorlessness is determined on a color scale, and the color scale is selected from one or more of RAL 1013 Oyster white, RAL 9001 Cream, RAL 9003 Signal white, RAL 9010 Pure white and RAL 9016 Traffic white.

3. The fire-retardant copolymer according to claim 1, wherein the fire-retardant copolymer comprises an odorlessness, and the odorlessness is less than 5 µg/m³ of air.

4. The fire-retardant copolymer according to claim 1, wherein the fire-retardant copolymer is self-extinguishing in view of DIN 4102-2 (B2).

5. A fire-retardant molding compound for polymerization or extrusion having at least one fire-retardant copolymer of formula (7)

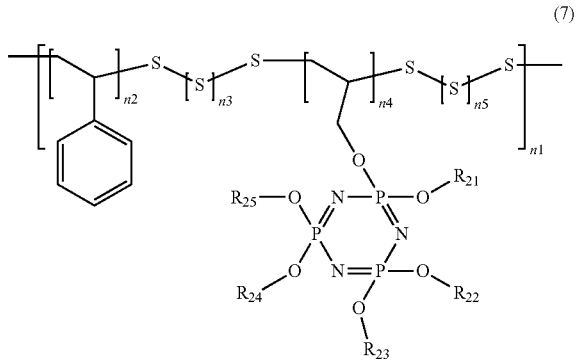

(7)

and comprising at least one other compound, wherein:
$n_1=1-1000$;
$n_2=1-500$;
$n_3=0-1$;
$n_4=1-500$;
$n_5=0-1$;
$R^{21}$ to $R^{25}$ are each allyloxy ($C_3H_6O$); and
wherein the fire-retardant copolymer comprises a sulfur content of less than or equal to 10% by weight of the fire-retardant copolymer.

6. The fire-retardant molding compound according to claim 5, wherein the at least one other compound comprises a polymer.

7. The fire-retardant molding compound according to claim 6, wherein the polymer comprises polystyrene.

8. The fire-retardant molding compound according to claim 5, wherein the at least one other compound comprises a phosphorus-containing additive.

9. The fire-retardant molding compound according to claim 8, wherein the phosphorus-containing additive comprises 2,4,8,10-tetraoxa-3,9-diphosphaspiro [5.5] undecane-3,9-dimethyl-3,9-dioxide (0.1-10% by weight) or hexaphenoxycyclotriphosphazene (0.5-20% by weight).

10. The fire-retardant molding compound according to claim 5, wherein the at least one other compound comprises a homopolymeric polystyrene (PS) or an expandable styrene polymers (EPS) or extruded foam sheets (XPS).

11. The fire-retardant molding compound according to claim 5, wherein the fire-retardant molding compound is self-extinguishing in view of DIN 4101-02 (B2).

12. The fire-retardant molding compound according to claim 5, wherein the fire-retardant molding compound comprises a colorlessness, the colorlessness is determined on a color scale, and the color scale is selected from one or more of RAL 1013 Oyster white, RAL 9001 Cream, RAL 9003 Signal white, RAL 9010 Pure white and RAL 9016 Traffic white.

13. The fire-retardant molding compound according to claim 5, wherein the fire-retardant molding compound comprises an odorlessness, and the odorlessness is less than 5 $\mu g/m^3$ of air.

14. The fire-retardant molding compound according to claim 5, wherein the fire-retardant molding compound further comprises at least one IR absorber having an average particle size within the range from 1 to 50 µm.

15. The fire-retardant molding compound according to claim 5, wherein the at least one IR absorber comprises graphite, carbon black, or aluminum, or any combination thereof.

16. A molding material, comprising the fire-retardant molding compound according to claim 5, wherein the molding material has a density of 5 to 150 $kg/m^3$.

17. The molding material according to claim 16, wherein the molding material is a foam.

18. A method for producing the fire-retardant molding compound according to claim 5, comprising the steps:
 a. mixing an organic blowing agent into a polymer melt comprising at least one fire-retardant copolymer having or not having phosphorus-containing additives by means of static and/or dynamic mixers at a temperature of at least 150° C.;
 b. cooling the blowing agent-containing polymer melt to a temperature of at least 120° C.;
 c. discharging through a nozzle plate having holes whose diameter at the nozzle outlet is at most 1.5 mm; and
 d. granulating the blowing agent-containing melt directly behind the nozzle plate under water at a pressure within the range of 1 to 20 bar.

19. A method for producing the fire-retardant molding compound according to claim 5, comprising the steps:
 a. polymerizing,
 b. adding an organic blowing agent before, during and/or after the polymerization and
 c. separating the expandable, blowing agent-containing copolymers by means of sieving.

20. An insulating material for buildings or a structure for electronics comprising the fire-retardant molding compound according to claim 5.

* * * * *